United States Patent
Nordström et al.

(10) Patent No.: US 9,769,835 B2
(45) Date of Patent: Sep. 19, 2017

(54) METHOD AND APPARATUS FOR COMMUNICATION LINK ADAPTATION FOR INTERFERENCE-CANCELING RECEIVERS

(71) Applicant: Telefonaktiebolaget L M Ericsson (publ), Stockholm (SE)

(72) Inventors: Fredrik Nordström, Lund (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 679 days.

(21) Appl. No.: 14/196,497

(22) Filed: Mar. 4, 2014

(65) Prior Publication Data

US 2015/0117327 A1 Apr. 30, 2015

Related U.S. Application Data

(60) Provisional application No. 61/898,047, filed on Oct. 31, 2013.

(51) Int. Cl.
*H04W 72/08* (2009.01)
*H04W 24/10* (2009.01)
(Continued)

(52) U.S. Cl.
CPC ....... *H04W 72/082* (2013.01); *H04J 11/0053* (2013.01); *H04J 11/0056* (2013.01);
(Continued)

(58) Field of Classification Search
CPC .. H04W 72/082–72/085; H04W 24/08–24/10; H04W 28/0236;
(Continued)

(56) References Cited

U.S. PATENT DOCUMENTS

| 5,687,189 A | 11/1997 | Smith et al. |
| 6,002,727 A | 12/1999 | Uesugi |

(Continued)

FOREIGN PATENT DOCUMENTS

| WO | 2005062497 A1 | 7/2005 |
| WO | 2007147506 A1 | 12/2007 |

(Continued)

OTHER PUBLICATIONS

Unknown Author, "Discussion on CQI calculation methods for NAICS", 3GPP TSG RAN WG1 Meeting #76 R1-140343 Source: LG Electronics Prague, Czech Republic, Feb. 10-14, 2014, 1-3.

(Continued)

*Primary Examiner* — Eric Myers
(74) *Attorney, Agent, or Firm* — Murphy, Bilak & Homiller, PLLC

(57) ABSTRACT

Network-side and device-side methods and apparatuses improve transmit link adaptation for devices operating in a cellular network that have interference-canceling receivers. Own-cell link adaptation towards a device in a current transmission interval exploits a determined mapping between the interfering-signal cancelation efficiency of the device versus the interfering-signal transport format, in combination with actual knowledge of the transport format that will be used to make an interfering neighbor-cell transmission in the current transmission interval. For example, a serving radio node uses the known transport format of the interfering transmission, to accurately determine the expected cancellation efficiency for the device with respect to the interfering transmission, and uses the expected cancellation efficiency to obtain a more accurate estimate of the own-cell channel quality expected for the device in the current transmission interval. Link adaptation towards the (Continued)

device in the current transmission interval uses this more accurate estimate of own-cell channel quality.

6 Claims, 6 Drawing Sheets

(51) Int. Cl.
*H04J 11/00* (2006.01)
*H04L 1/00* (2006.01)
*H04W 28/02* (2009.01)
*H04W 28/04* (2009.01)

(52) U.S. Cl.
CPC .......... *H04L 1/0001* (2013.01); *H04L 1/0035* (2013.01); *H04W 24/10* (2013.01); *H04W 28/0236* (2013.01); *H04W 28/048* (2013.01)

(58) Field of Classification Search
CPC . H04W 28/04; H04W 28/048; H04J 11/0053; H04J 11/0056; H04L 1/0001; H04L 1/0035
See application file for complete search history.

(56) References Cited

U.S. PATENT DOCUMENTS

| | | |
|---|---|---|
| 6,922,434 B2 | 7/2005 | Wang et al. |
| 7,359,689 B2 | 4/2008 | Horisaki et al. |
| 7,773,951 B2 | 8/2010 | Molnar et al. |
| 7,782,987 B2 | 8/2010 | Jonsson |
| 7,856,243 B2 | 12/2010 | Gunnarsson et al. |
| 8,218,606 B2 | 7/2012 | Jonsson |
| 8,224,278 B2 | 7/2012 | Cairns |
| 8,254,325 B2 | 8/2012 | Niewczas et al. |
| 8,340,202 B2 | 12/2012 | Huss et al. |
| 8,369,793 B2 | 2/2013 | Molnar |
| 8,432,874 B2 | 4/2013 | Bjorkegren |
| 8,948,323 B2 | 2/2015 | Cheng et al. |
| 2007/0177501 A1 | 8/2007 | Papasakellariou |
| 2007/0183544 A1 | 8/2007 | Lee et al. |
| 2007/0275722 A1 | 11/2007 | Thorson et al. |
| 2009/0088080 A1 | 4/2009 | Zhang et al. |
| 2009/0088172 A1 | 4/2009 | Lusky et al. |
| 2009/0316591 A1 | 12/2009 | Reial et al. |
| 2010/0158161 A1 | 6/2010 | Sambhwani et al. |
| 2010/0317355 A1 | 12/2010 | Zangi et al. |
| 2011/0081871 A1* | 4/2011 | Molnar ................ H04L 1/0007 455/67.13 |
| 2011/0103520 A1 | 5/2011 | Molnar |
| 2011/0261872 A1 | 10/2011 | Wang et al. |
| 2012/0027115 A1 | 2/2012 | Grant et al. |
| 2012/0189083 A1 | 7/2012 | Reial |
| 2012/0218913 A1* | 8/2012 | Park .................... H04B 7/0632 370/252 |
| 2013/0077578 A1 | 3/2013 | Wang et al. |
| 2014/0341130 A1* | 11/2014 | Son .................... H04W 72/085 370/329 |

FOREIGN PATENT DOCUMENTS

| | | |
|---|---|---|
| WO | 2009123515 A1 | 10/2009 |
| WO | 2010023100 A2 | 3/2010 |
| WO | 2012071724 A1 | 6/2012 |
| WO | 2012075387 A1 | 6/2012 |
| WO | 2013067130 A1 | 5/2013 |
| WO | 2014004897 A1 | 1/2014 |

OTHER PUBLICATIONS

Reial, A. et al., "Method and Apparatus for Signal Quality Reporting for Interference-Cancellation Receivers." U.S. Appl. No. 13/930,686, filed Jun. 28, 2013.
Author Unknown, "Discussion on the Definition of CQI in CoMP," 3GPP TSG RAN WG1 #68; R1-120170; Feb. 6-10, 2012. pp. 1-2. Dresden, Germany.
Author Unknown, "Study on Network-Assisted Interference Cancellation and Supression for LTE," 3GPP TSG RAN Meeting #59; RP-130404; Feb. 26-Mar. 1, 2013. pp. 1-7. Vienna, Austria.
Kahn, A. A., "Interference Management for Heterogeneous Networks in 3GPP LTE Advanced and Beyond," KTH Information and Communication Technology. TRITA-ICT-EX-2011:232. 2011. pp. 1-131. Stockholm, Sweden.

* cited by examiner

METHOD AND APPARATUS FOR COMMUNICATION LINK ADAPTATION FOR INTERFERENCE-CANCELING RECEIVERS

RELATED APPLICATIONS

This application claims priority from U.S. Provisional Application No. 61/898,047, filed on 31 Oct. 2013, the content of said application incorporated herein by reference in its entirety.

TECHNICAL FIELD

The present invention generally relates to cellular communication networks and particularly relates to link adaptation in such networks towards receivers with interference-canceling receivers.

BACKGROUND

In order to meet higher capacity demands and enhanced user experiences, cellular communications networks such as Long Term Evolution, LTE, need to be deployed with an increasing density of base stations. This densification can be achieved by splitting macro cells and by deploying small cells in highly loaded geographical areas, or so called traffic hotspots, within the coverage area of macro cells. With densification of cellular networks, radio resources can be further reused and users generally will be closer to their serving base stations, which enables higher bitrates.

Cellular networks with a mixture of macro cells and small cells with overlapping coverage areas are sometimes referred to as heterogeneous networks. These types of networks are seen as an important complement to macro cell splitting. One example of such deployments is where clusters of pico cells are deployed within a macro coverage area to offload macro traffic. A pico base station represents one example of a low power node, LPN, transmitting with low output power and correspondingly serving a much smaller geographical area than a high power node, such as the typical macro base station. Other examples of low power nodes are home base stations and certain types of relays.

A consequence of network densification is that wireless devices, such as user equipments (UEs), operating in the network will experience lower geometries, which implies that downlink inter-cell interference can be more pronounced and thus limit the achievable bit rates. Hence, in dense cellular deployments, interference mitigation techniques have the potential to substantially improve the user performance. Interference mitigation can either take place on the transmitter side or on the receiver side, or a combination of both. Interference mitigation techniques often exploit the structure of the physical layer transmission used in the involved radio access technology.

Regarding receiver-side of techniques for mitigating inter-cell interference, interference rejection combining or IRC is a well-known receiver type for suppressing interference. IRC processing requires estimation of an interference/noise covariance matrix. Such matrices express the covariance of interference between the signals being combined via IRC processing. More advanced receiver types for interference mitigation are based on interference cancelation or IC. With IC processing, unwanted received signals, e.g., intra/inter-cell interference, are estimated and subtracted from the "overall" received signal. In this regard, the overall received signal can be understood as being a composite of desired and undesired signals impinging on the receiver antennas.

Maximum Likelihood, ML, is another interference mitigation technique. ML-type receivers recover transmitted symbol information from a received signal based on jointly detecting symbol information from multiple signals, e.g., from several different cells. The joint decision is determined based on minimizing a joint error metric. ML-type receivers usually rely on searching among all possible combinations of defined symbol values, which are also referred to as modulation constellation points.

IRC and IC were established as UE reference receiver techniques in Release 11 of the applicable LTE technical specifications by the Third Generation Partnership Project, 3GPP. However, in LTE Release 11, also referred to as Rel-11, IC was restricted to cancelation of always-on signals, and the network assisted the UE as to how such signals were transmitted in the aggressor cells. The Common Reference Symbols or CRS, which are transmitted in LTE networks on a cell-specific basis, represent one type of always-on signal for which IC-based interference mitigation would be performed.

However, there is a growing interest in developing approaches for the cancelation and suppression of interference corresponding to scheduling of data, and such features are an item of interest in ongoing work for LTE Rel-12. Consequently, IC receivers in UEs for mitigating downlink interference arising from neighbor-cell data transmissions are now gaining popularity. The IC receiver in the victim UE—i.e., the UE experiencing the interference at issue—demodulates and optionally decodes the interfering signals, and produces an estimate of the transmitted and the corresponding received interfering signal. The receiver then removes that estimate from the overall or total received signal, to improve the effective signal-to-noise-plus-interference ratio, SINR, for the desired signal.

In post-decoding IC receivers, the interfering data signal is demodulated and decoded. The decoding results and channel estimates for the interfering signal are used to estimate the interfering signal's contribution to the composite received signal—i.e., interfering signal as received by the IC receiver is regenerated from the decoding results. The regenerated signal is then removed from the composite received signal, for improved demodulation and decoding of the desired signal or signals from the composite received signal. Post-decoding IC receivers are sometimes referred to as Code-Word IC, CWIC, receivers.

As an alternative to post-decoding IC processing, pre-decoding IC receivers perform the regeneration step directly after demodulation, thus bypassing the channel decoder with respect to the interfering signal at issue. That is, a pre-decoding IC receiver performs symbol detection with respect to an interfering signal but does not provide the detection results to its decoder. Instead, the detection results are used, e.g., in a "soft" symbol mapping process, to regenerate the interfering signal, for removal from the composite received signal. Pre-decoding receivers are sometimes referred to as Symbol Level IC, SLIC, receivers.

The term cancelation efficiency or CE of an IC receiver denotes the fraction of impairment (interference plus noise) power remaining in the received signal, after the receiver performs cancelation processing. The CE for the pre- and post-decoding IC approaches may be essentially equal in some scenarios and vary significantly in others. For example, the post-decoding IC approach typically provides superior performance at "high" SINR operating points. The preferred approach is based on applying soft signal mapping and regeneration, as opposed to using hard symbol or bit decisions.

In many IC receiver architectures, as well as IRC and ML architectures, some prior knowledge about the interfering signal is required to perform interference mitigation or to enhance the performance of such mitigation. Basic information includes knowledge about at least a subset of the resource allocation of the interfering signal, modulation-related parameters of the interfering signal, and coding-related parameters of the interfering signal. For example, in LTE, resource allocation knowledge would mean knowing at least some of the Resource Blocks or RBs used for the interfering signal. In networks that use High-Speed Packet Access, HSPA, the resources in question are codes used on the High-Speed Physical Downlink Shared Channel or HS-PDSCH. Example modulation-related parameters include transmission mode, modulation format, Multiple-Input-Multiple-Output, MIMO, rank, precoding weights, etc. Example coding-related parameters include transport block size, code rate, etc.

Receiving a neighbor-cell downlink, DL, control channel represents one mechanism for obtaining knowledge about interfering data transmissions in the neighbor cell. More particularly, in advance of a neighbor-cell making a downlink data transmission to a given neighbor-cell UE, a control message is sent on the control channel of the neighbor cell. That control message carries resource allocation information, transport format information, etc., for use by the targeted neighbor-cell UE in receiving the upcoming data transmission.

In LTE, such a control channel is referred to as the Physical Downlink Control Channel or PDCCH, while HSPA-based networks use a High Speed Shared Control Channel or HS-SCCH. Although the neighbor-cell control channel may be power-controlled towards the intended neighbor-cell UE and not toward the victim UE, in many scenarios of interest, the victim UE nonetheless experiences signal quality sufficient for decoding the control message associated with the interfering signal. From this point forward, the term "IC receiver" refers to a receiver that can mitigate neighboring cell interference. Examples of such receivers are IRC, ML, SLIC and CWIC.

In LTE, HSPA and other contemporary cellular networks, the DL transmissions to UEs use fast link adaptation. In this scheme, a given UE signals to its serving cell the channel quality experienced by the UE at the current scheduling interval, which for LTE is the current subframe and in HSPA is the current Transmission Time Interval or TTI. Here, it will be understood that the LTE subframe is functionally the same as the HSPA TTI, in the sense that they both represent a basic scheduling interval. The UE further indicates the preferred rank and precoding properties. The serving radio node (or base station or NodeB) receives this information and schedules a DL transmission several subframes or TTIs later using a transport format that the UE is able to successfully decode, assuming the previously reported channel quality. Problematically, however, the interference properties at the current and future subframes or TTIs are different, and the achievable IC gain at the UE for the future subframe or TTI is difficult to predict.

The difference between reception conditions as they exist at the UE when the scheduled transmission is later received and as they existed at the earlier reporting time often means that the CE of IC processing at the UE during reception of the scheduled transmission does not match the CE achievable at the time channel quality was reported. Fortunately, in practical networks, the serving radio node usually applies some type of adjustment to reported channel quality to obtain a desired long-term target Block Error Rate or BLER.

This leads to more aggressive transport format, TF, scheduling for IC-capable UEs, as compared to non-IC UEs with linear receivers, and it helps in the realization of average throughput, TP, gains and cell capacity gains from IC.

However, there are existing approaches directed to the mismatch between channel quality as reported by a UE versus actual channel quality during a later transmission to the UE. For example, an IC UE may predict the transport format, TF, that will be used by a neighbor-cell base station when making a transmission that will interfere with the UE's reception of scheduled data. The UE then adjusts its current channel quality report in view of the predicted TF. That adjustment reflects the sensitivity of CE to the TF of interfering signals. Of course, the adjustment is imperfect in the sense that the prediction may be wrong.

In another approach, an IC UE reports own-cell channel quality and additionally reports channel quality with respect to one or more interfering neighbor cells. The serving radio node uses the additional information to better estimate what the channel quality will be at the UE during the later-scheduled transmission to the UE. Problematically, however, these approaches do not address the problem recognized herein. Namely, by not accounting for the actual TF of the interfering signals at the UE at the actual time of transmission to the UE, the network fails to realize the throughput and performance gains possible with IC UEs, by using link adaptations that are either too aggressive or not aggressive enough, which leads to reduced system capacity as a consequence of not fully exploiting the channel capacity.

For example, overly aggressive TF selection causes an increased incidence in retransmissions and hence uses more time-frequency resources than necessary. On the other hand, if TF selection is too conservative with respect to actual channel conditions at the UE during the transmission interval at issue, the UE is served at an effective SINR that is above what is needed for reliable decoding of the transmitted data.

SUMMARY

According to one aspect of the teachings herein, network-side and device-side methods and apparatuses improve transmit link adaptation for devices operating in a cellular communication network that have interference-canceling receivers. In particular, own-cell link adaptation towards a given device in a current transmission interval advantageously exploits a determined mapping between the interfering-signal cancelation efficiency of the device versus interfering-signal transport format, in combination with actual knowledge of the transport format that will be used to make an interfering neighbor-cell transmission in the current transmission interval.

An example embodiment is seen in a method of link adaptation toward a wireless device, where a serving radio node in a cellular communication network performs the contemplated method. The method includes determining a mapping between interfering-signal transport formats and corresponding interfering-signal cancelation efficiencies of the device, based on receiving interference-cancelation capability information from the device. Further, the method includes receiving an indication of which transport format has been selected for use in a current transmission interval, for a neighbor-cell transmission that is expected to be an interfering transmission with respect to an own-cell transmission to be made by the serving radio node towards the device in the current transmission interval.

Still further, the method includes determining the interference cancelation efficiency expected for the device with respect to the neighbor-cell transmission, as a function of the determined mapping and the transport format known from the received indication. Correspondingly, the method additionally includes estimating the own-cell signal quality that will be experienced at the device in the current transmission interval, as a function of the determined cancelation efficiency and an own-cell channel quality value indicated by the device in channel quality report received from the device in a prior transmission interval, and selecting the transport format to use for the own-cell transmission as a function of the estimated own-cell quality.

An example serving radio node in the context of the above-described method comprises a radio base station, such as a Node B or eNodeB in 3GPP parlance. A base station in an example implementation includes a processing circuit that is configured to carry out processing operations that implement the above-described method. For example, the processing circuit includes or is associated with a computer-readable medium, such as FLASH or disk storage. In turn, the computer-readable medium stores a computer program that includes program instructions which, when executed by the processing circuit, configure the radio node to determine the mapping, determining the transport format that actually will be used for an interfering transmission, determining the cancelation efficiency expected for the device as a function of that known transport format, estimating the own-cell channel quality expected for the device as a function of the determined cancelation efficiency, and selecting the transport format to use for serving the device in the current transmission interval, as a function of the estimated own-cell channel quality.

Another embodiment comprises a method of channel quality reporting by a wireless device having an interference-canceling receiver. The method includes sending interference-cancelation capability information to the network, indicating one or more characteristics of interference-cancelation processing the device is configured to perform. Further, the method includes generating a channel quality report for a serving radio node in the network with respect to a current transmission interval.

The channel quality report is based on determining one or more neighbor-cell channel quality values with respect to a neighbor cell originating a neighbor-cell transmission that was detected by the device as an interfering transmission in the current transmission interval, and determining a set or range of serving-cell channel quality value versus different interference cancelation efficiencies assumed for the interfering transmission, or versus different transport formats assumed for interfering transmission. The method further includes transmitting the channel quality report to the serving radio node.

A wireless device in the context of the above-described device-side method comprises, for example, a User Equipment or UE in 3GPP parlance. In an example implementation, the device includes a processing circuit that is configured to carry out processing operations that implement the above-described method. For example, the processing circuit includes or is associated with a computer-readable medium, such as FLASH or disk storage. In turn, the computer-readable medium stores a computer program that includes program instructions which, when executed by the processing circuit, configure the device to determine and report own-cell and neighboring cell channel quality as described.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
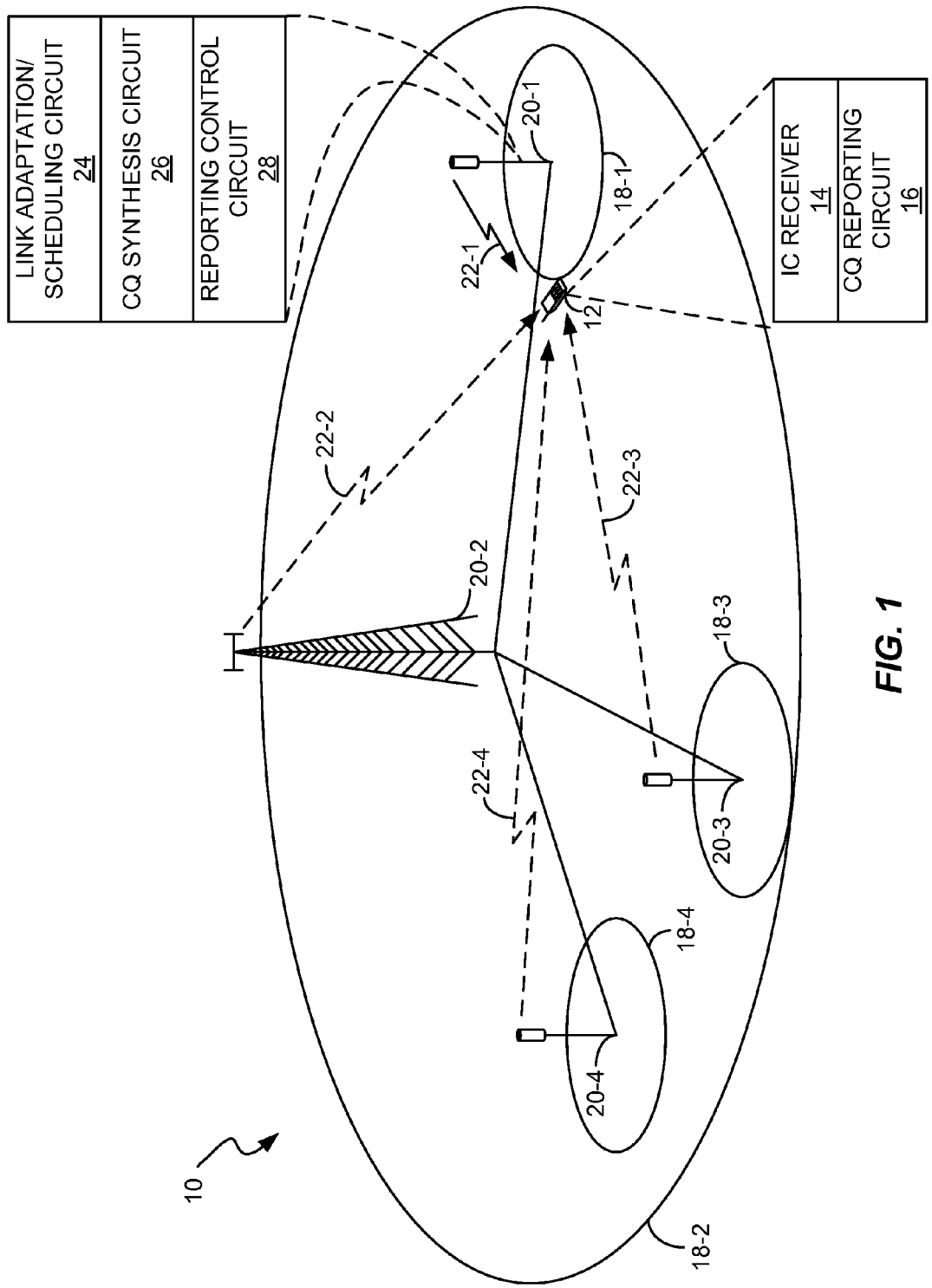
FIG. 1 is a block diagram of one embodiment of a cellular communication network, including a radio node and a wireless device having an interference-canceling receiver.

FIG. 1 is a block diagram of one embodiment of a cellular communication network 10 that is configured to provide service to a potentially large plurality of wireless devices 12, where one such device 12 is shown for ease of discussion. The device 12 is contemplated according to an example embodiment and includes an interference-canceling, IC, receiver 14, and a Channel Quality, CQ, reporting circuit 16.

As will be detailed, the interference-canceling receiver 14 achieves different characteristic cancelation efficiencies with respect to a given interfering signal, in dependence on the particular transport format used for the interfering signal. Here, "transport format" connotes characteristic structure or format used for information transmission. In an LTE example, the transport format includes the block size used to transmit information, which in turn relates to the Modulation-and-Coding-Scheme or MCS used to transmit the information and the number of Physical Resource Blocks or PRBs allocated for transmitting the information. The channel-quality reporting circuit 16 is, in an example embodiment, configured to report own-cell channel quality as a function of different transport format assumptions for an interfering neighbor-cell signal detected during the reporting interval.

Turning back to the diagram, the network 10 includes a number of cells 18 having associated radio nodes 20, e.g., base stations such as Node Bs in an HSPA network and eNodeBs in an LTE network. Generally, a given device 12 will be "served" at any given time by one or more cells 18, referred to a "serving" cell 18. For example, the serving cell(s) 18 make scheduled downlink transmissions 22 to the device 12. Reception of those own-cell transmissions 22 at the device 12 may be interfered with by one or more neighbor-cell transmissions 22, which are directed to given devices 12 being served in those neighbor cells 18.

One sees an example scenario depicted in the diagram, wherein the cell 18-1 is a serving cell 18 with respect to the device 12, and the downlink transmissions 22-1 from the radio node 20-1 are potentially interfered with by concurrent downlink transmissions 22 in one or more neighboring cells 18. For example, the transmission 22-2 from the base station 20-2 in the cell 18-2 may be an interfering transmission and/or one or both of the transmissions 22-3 and 22-4 from radio nodes 20-3 and 20-4 in respective cells 18-3 and 18-4 may be interfering transmissions. Here, it will be understood that these interfering neighbor-cell transmissions 22-2, 22-3, and/or 22-4 may be directed to wireless devices 12 operating in their respective cells 18-2, 18-3, and 18-4, but for clarity the diagram does not show these other users. Further, it will be understood that with dynamic user scheduling, device mobility and changing reception conditions, the particular neighbor cell 18 or cells 18 that are interfering may change.

There are common interference situations, however. For example, although the drawing is not to scale, one sees in FIG. 1 that the network 10 is depicted as a heterogeneous network in which different cells have different sizes or coverage areas. Here, a "cell" may be understood as the allocation of particular air interface resources—e.g., a given carrier frequency or frequency subband—for providing radio service in a corresponding geographic region, area or location. In a known heterogeneous network arrangement, a large or macro cell 18 (18-2 in FIG. 1) is overlaid by one or more small or pico cells 18 (18-1, 18-3 and 18-4 in FIG. 1). The pico cells 18 are used to fill in coverage gaps in the macro cell area, to extend the capacity of the network 10 in the macro cell area, and/or to provide higher data rate "hotspot" coverage within the macro cell area.

In such heterogeneous arrangements, it is common for a device 12 being served by a pico cell 18 to experience potentially significant downlink interference from the associated macro cell. In the diagram, for example, the radio node 20-1 may be assumed to be the serving radio node, meaning that own-cell transmissions 22-1 from the radio node 20-1 towards the device 12 operating in the pico cell 18-1 may experience significant interference arising from overlapping neighbor-cell transmissions by the radio node 20-2 towards another device 12 being served in the macro cell 18-2. Such interference becomes especially problematic as the device 12 moves towards the boundary area of the pico cell 18-1, where the device 12 may see a relatively high channel quality towards the interfering neighbor cell 18-2.

Of course, the device 12 may experience interference from one or more of the other pico cells 18-3 and 18-4. Moreover, even in embodiments of the network 10 that use homogeneous cell and radio node arrangements, e.g., embodiments that use more uniformly sized cells 18 and radio nodes 20 of comparable transmit power, the device 12 may experience interfering transmission 22 from one or more neighbor cells 18, while operating in a given serving cell 18.

With these points in mind, one or more of the radio nodes 20 in the network 10 are configured according to the teachings herein, to thereby provide improved link adaptation towards devices 12 having interference-canceling receivers 14. In an example arrangement as illustrated by FIG. 2, the contemplated radio node 20 includes a link adaptation circuit 24, which may be encompassed in a user scheduling circuit, for adapting the transmission link according to the teachings herein, a channel quality synthesis circuit 26, for estimating channel quality according to the teachings herein, and a channel quality reporting control circuit 28, for controlling channel quality reporting by devices 12 according to the teachings herein.

Figure 2:
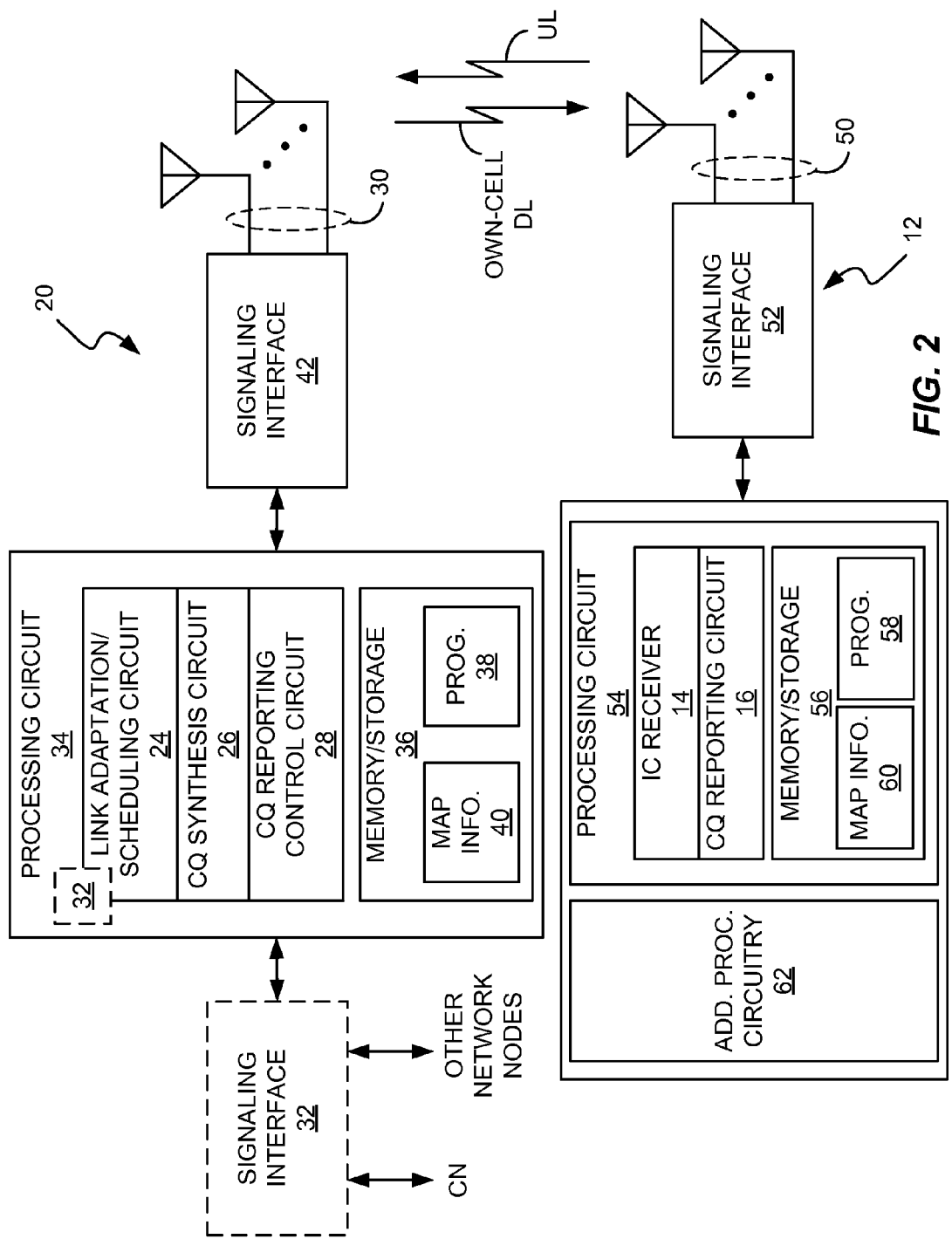
FIG. 2 is a block diagram of example implementation details with respect to the radio node and wireless device, as contemplated herein.

FIG. 2 illustrates more details for an example radio node 20 and an example device 12. The illustrated radio node 20 is configured for operation in a cellular communication network 10 as a serving radio node with respect to a wireless device 12, and it comprises a first signaling interface 32 that is configured to receive transport format selection information, and a second signaling interface 42 that is configured to send signaling to the wireless device 12 and to receive signaling from the wireless device 12. The node 20 further includes a processing circuit 34 that is operatively associated with the first and second signaling interfaces 32 and 42 and configured to perform link adaptation towards the device 12.

The processing circuit 34 is configured to determine a mapping between interfering-signal transport formats and corresponding interfering-signal cancelation efficiencies of the device 12, based on interference-cancelation capability information received from the device 12, and to receive, via the first signaling interface 32, an indication of which transport format has been selected for use in a current transmission interval, for a neighbor-cell transmission that is expected to be an interfering transmission with respect to an own-cell transmission to be made by the serving radio node 20 towards the device 12 in the current transmission interval. The interference-capability information may be received via the second signaling interface 42, which in one or more embodiments comprises a wireless communication interface, e.g., cellular radio circuitry for transmitting downlink signals and receiving uplink signals.

The processing circuit 34 is further configured to determine the interference cancelation efficiency expected for the device 12 with respect to the neighbor-cell transmission, as a function of the determined mapping and the transport format known from the received indication, and to estimate the own-cell signal quality that will be experienced at the device 12 in the current transmission interval, as a function of the determined cancelation efficiency and an own-cell channel quality value indicated by the device 12 in the channel quality report received from the device 12 in a prior transmission interval. Still further, the processing circuit 34 is configured to select the transport format to use for the own-cell transmission as a function of the estimated own-cell quality. In this manner, the link adaptation—e.g., the selection of a specific transport format to use for the own-cell transmission in the current transmission interval—is based on knowledge of the actual transport format that will be used to perform the interfering transmission.

In one embodiment, the radio node 20 controls or otherwise coordinates the neighbor-cell transmission, and the first signaling interface 32 is an internal interface implemented within the processing circuit 34. By way of non-limiting example, an internal interface can be a logical signaling interface between processing routines or functions being carried out in common by a given digital signal processor or other digital processing circuit, or it can be a physical signaling between different processing devices, e.g., on a backplane or other circuit board within the radio node 20.

In another embodiment, the radio node 20 does not control or otherwise coordinate the neighbor-cell transmission, and the first signaling interface 32 is an external interface coupling the radio node 20 to another node 20 in the network 10 having knowledge of the transport format that has been selected for the neighbor-cell transmission. In an LTE embodiment, for example, where the radio node 20 comprises an eNodeB, the first signaling interface 32 comprises an X2 interface to one or more neighboring eNodeBs. More broadly, the first signaling interface 32 in such embodiments is an inter-base-station or other inter-node communication interface that communicatively couples the radio node 20 to another, external node in the network 10 that has knowledge of the transport format that will be used for the interfering transmission.

As will be appreciated, the processing circuit 34 comprises one or more physical or functional circuits, and it may be realized using fixed circuit elements, programmed processing circuits, or some combination of both. In at least one embodiment, the processing circuit 34 is programmatically configured as a specially-adapted machine for carrying out the network-side operations taught herein, for link adaptation with respect to devices 12 having interference-canceling receivers 14. For example, the computer program 38 may be a computer program product stored in the memory/storage 36, which storage may be FLASH, disk storage, or some other computer-readable medium providing persistent storage of the computer program 38.

Figure 3:
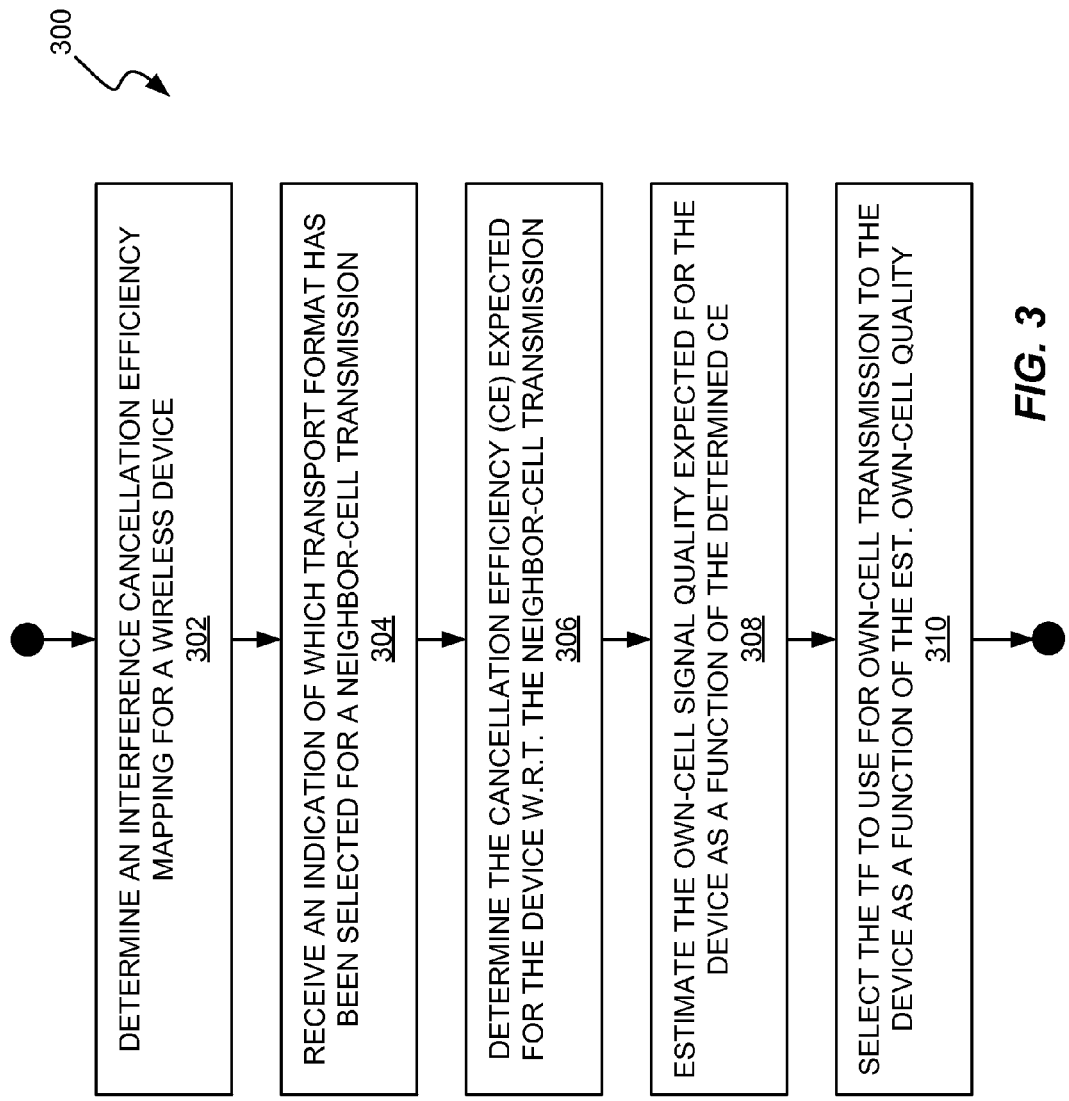
FIG. 3 is a logic flow diagram of one embodiment of a method of link adaptation at a serving radio node, with respect to a wireless device having an interference-canceling receiver.

The computer program 38 comprises program instructions that when executed by the processing circuit 34 configured the processing circuit 34 to carry out the example method 300 illustrated in FIG. 3. Of course, it is contemplated that the processing circuit 34 can be configured to implement variations of the method 300, through programmatic changes and/or changes to fixed circuitry.

In any case, the method 300 is a method of link adaptation toward a wireless device 12 by a serving radio node 20 in a cellular communication network 10 and the method includes determining (Block 302) a mapping between interfering-signal transport formats and corresponding interfering-signal cancelation efficiencies of the device 12, based on receiving interference-cancelation capability information from the device 12. The interference-cancelation capability information may directly indicate the cancelation capabilities of the device 12 for different transport formats, e.g., for a number of defined transport formats. In other embodiments, the interference-cancelation capability information simply identifies the type interference-canceling receiver 14 that is implemented by the device 12 and the node 20 relates this to a table or other data structure that maps the cancelation efficiency to different possible transport formats.

For example, the mapping information 40 may comprise look-up tables that provide such a mapping for different types or grades of interference-canceling receivers 14. Consider that in one embodiment, the device 12 is configured to send interference-cancelation capability information comprising an indication as to whether the device 12 is configured to perform pre-decoding interference cancelation or post-decoding interference cancelation. On the network side in such embodiments, the mapping information 40 comprises one or more look-up tables for pre-decoding types of interference-canceling receivers and one or more look-up tables for post-decoding types of interference-canceling receivers.

Further, the mapping information may be multi-dimensional. That is, in some embodiments, the mapping is one-dimensional, where the expected interference cancelation efficiency of the interference-canceling receiver 14 of the device 12 is expressed solely as a function of the transport format of the interfering signal to be canceled. In other embodiments, the mapping information is multi-dimensional, e.g., mapping is performed as a function of the transport format of the interfering signal to be canceled, and further as a function of channel quality at the device 12 with respect to the interfering signal. In one such embodiment, the mapping information comprises, for a given type of interference-canceling receiver 14, two or more tables, each one mapping different transport formats to different cancelation efficiencies, for a corresponding interfering-signal quality or range of signal quality.

There may be a set of such tables for each characterized type of interference-canceling receiver 14. Moreover, those of skill in the art will appreciate that the tables for a given receiver type can be consolidated into a multi-dimensional table or matrix, which is indexed by interfering-signal channel quality and interfering-signal transport format.

In any case, the method 300 further includes receiving (Block 304) an indication of which transport format has been selected for use in a current transmission interval, for a neighbor-cell transmission that is expected to be an interfering transmission with respect to an own-cell transmission to be made by the serving radio node 20 towards the device 12 in the current transmission interval. That is, by virtue of obtaining this indication, the radio node 20 definitively knows the actual transport format that will be used to make the interfering transmission and, in turn, the method 300 includes determining (Block 306) the interference cancelation efficiency expected for the device 12 with respect to the neighbor-cell transmission, as a function of the determined mapping and the transport format known from the received indication.

In an example case, the known transport format will match one of the transport formats that is an entry or data point within the determined mapping. For example, assume that the determined mapping expresses the cancelation efficiency as a function of five different possible transport formats. If the known transport format matches one of those, then the cancelation efficiency corresponding to that matched transport format entry is taken to be the cancelation efficiency that the device 12 is expected to achieve in the current transmission interval with respect to interfering signal. If the known transport format does not match any of the transport format entries in the determined mapping, then the cancelation efficiency can be determined by interpolating between the two closest-matching transport formats in the determined mapping—e.g., the two transport format entries that bracket the known transport format in terms of block size parameters, MCS, etc.

In turn, the method 300 further includes estimating (Block 308) the own-cell signal quality that will be experienced at the device 12 in the current transmission interval, as a function of the determined cancelation efficiency and an own-cell channel quality value indicated by the device 12 in channel quality report received from the device 12 in a prior transmission interval. Still further, the method 300 includes selecting (Block 310) the transport format to use for the own-cell transmission as a function of the estimated own-cell quality.

With respect to the above processing, the "prior" transmission interval may be the immediately prior transmission interval, or may be earlier than the immediately prior transmission interval. Further, the channel quality at issue may be averaged over more than one prior transmission interval. Here, a "transmission interval" generally comprises the unit of time used defined by the network 10 for making scheduling decisions. In an HSPA embodiment example, the transmission interval is one Transmission Time Interval or TTI, which comprises one subframe of two milliseconds duration, and where five subframes comprise an overall frame. In an LTE embodiment example, the transmission interval is one subframe of one millisecond duration, where ten subframes comprise an overall frame.

Thus, for adapting the transmission link, for making an own-cell transmission to served device 12 in the current transmission interval, the radio node 20 obtains exact knowledge of the transport format that will be used by a neighbor-cell 18 in making a neighbor-cell transmission that is expected to interfere with the own-cell transmission. Here, the neighbor-cell transmission is expected to interfere, based on the device 12 previously reporting the neighbor-cell 18 as an interfering cell. Thus, the radio node 20 uses the known transport format and the determined mapping information to accurately estimate the cancelation efficiency that the device 12 is expected to achieve with respect to the interfering transmission, and to use that accurately estimated cancelation efficiency along with previously reported own-cell channel quality information, to accurately estimate the actual own-cell post-IC channel quality that the device 12 will experience with respect to the own-cell transmission in the current transmission interval.

In some embodiments, the channel quality report received from the device 12 in the prior transmission interval indicates neighbor-cell channel quality values for more than one neighbor cell 18, as determined by the device 12 for the neighbor cells 18 in the prior transmission interval, and further indicates a set or range of own-cell channel quality values, as determined by the device 12 for the prior transmission interval, for a corresponding set or range of assumed cancelation efficiencies with respect to each such neighbor cell 18.

In such embodiments, the processing circuit 34 is configured to use the reported neighbor-cell channel quality values as an extra dimension in determining the cancelation efficiency expected for the device 12 in the current transmission interval with respect to the interfering transmission to be made by the neighbor cells 18 for which the channel quality values were reported. That is, the radio node 20 is configured to consider the neighbor-cell channel quality reported by the device 12 in a prior transmission interval as well as the neighbor-cell transport format known for the current transmission interval, to determine the cancellation efficiency expected at the device 12 with respect to the neighbor cell 18 in the current transmission interval.

Such processing reflects the fact that the cancelation efficiency of the device 12 with respect to a given interfering neighbor-cell transmission depends on the channel quality of the interfering transmission, in addition to depending on the transport format of the interfering transmission. Thus, determining (Block 306) the interference cancelation efficiency expected for the device 12 with respect to given neighbor-cell transmissions in the current transmission interval further is a function of the channel quality values indicated for the given neighbor cells 18 in the prior channel quality report.

In at least one embodiment, estimating (Block 308) the own-cell signal quality that will be experienced at the device 12 in the current transmission interval comprises selecting the own-cell channel quality value in the indicated set or range of own-cell channel quality values corresponding to the assumed cancelation efficiency that matches the determined cancelation efficiency. Alternatively, the estimation comprises interpolating between the two-own-cell channel quality values in the indicated set or range of own-cell channel quality values that correspond to the two assumed cancelation efficiencies bracketing the determined cancelation efficiency.

In some embodiments, in advance of receiving the channel quality report from the device 12 in the prior transmission interval, the method 300 further includes receiving an indication of interferer cells 18 detected by the device 12, including detection of the neighbor cell 18 as an interfering cell 18, and further includes identifying the neighbor cell 18 as being an interferer cell 18 of interest among one or more interferer cells 18 so identified by the device 12, and sending a return indication of the one or more interferer cells 18 of interest to the device 12. Thus, in some embodiments, the device 12 identifies the neighboring cells 18 that are interfering cells 18 and the radio node 20 indicates to the device 12 which ones of the interfering cells 18 should be reported on in the channel quality reports sent by the device 12. That is, the radio node 20 tells the device 18 for which interfering neighbor cells 18 to report channel quality. The radio node 20 may elect, for example, to have the device 12 report for only the strongest—dominant—interfering neighbor cell 18, or to report for the two strongest, three strongest, etc., neighbor cells 18. Alternatively, the radio node may have the device 12 report for specific interfering neighbor cells 18, based on the radio node 20 having advance knowledge of which neighbor cells 18 will be scheduled in a future transmission interval. Then, when that future transmission interval becomes the current transmission interval, the device 12 will have reported channel quality with respect to the neighbor cells 18 that will make a scheduled transmission in the current transmission interval.

Thus, according to some embodiments of the method 300, there may be two or more neighbor-cell transmissions that are expected to be interfering transmissions with respect to an own-cell transmission to be made by the serving radio node 20 towards the device 12 in the current transmission interval. Correspondingly, the step of receiving (Block 304) includes receiving indications of which transport formats have been selected for the interfering transmissions, the step of determining (Block 306) includes determining the cancelation efficiencies expected for the device 12 with respect to the interfering transmissions, and the step of estimating (Block 308) includes estimating the own-cell signal quality that will be experienced at the device 12 in the current transmission interval as a function of the determined cancelation efficiencies and the own-cell channel quality reported by the device 12 in the prior transmission interval.

Further, in some embodiments of the method 300, the channel quality report indicates a set or range of own-cell channel quality values, as determined by the wireless device 12 in the prior transmission interval for a set or range of assumed interfering-signal transport formats. Here, the step of estimating (Block 308) the own-cell signal quality comprises selecting the own-cell channel quality value from the indicated set or range that corresponds to the assumed interfering-signal transport format matching the transport format known from the received indication, or interpolating between the two own-cell channel quality values that correspond to assumed interfering signal transport formats that bracket the transport format known from the received indication.

Additionally, in some embodiments of the method 300, the method includes obtaining in one or more transmission intervals previous to the current transmission interval, indications of which transport formats were used for neighbor-cell transmissions from one or more neighbor cells 18, which were detected as interfering transmissions with respect to previous own-cell transmissions to the device 12. Knowledge of the actual transport formats used for past interfering transmissions can be used in determining (Block 302) the mapping between interfering-signal transport formats and corresponding interfering-signal cancelation efficiencies of the device 12. For example, the incidence of ACKs versus NACKs received for prior downlink transmissions can be used to infer the cancelation efficiencies being achieved at the device 12 with respect to past own-cell transmissions towards the device 12, where the transport format(s) of the interfering neighbor-cell transmission(s) during those past own-cell transmissions are known from the obtained indications. Thus, the radio node 20 correlates the incidence of ACKs and NACKs with the known interfering-signal transport formats and deduces or refines the interference cancelation efficiency of the device 12 for different interfering-signal transport formats.

Even in embodiments where the radio node 20 receives or is preconfigured with mapping information indicating the cancelation efficiency of the device's interference-canceling receiver 14 with respect different interfering-signal transport formats, the above ACK/NACK correlation processing can be used over time to refine or otherwise revise the table. Such an approach allows the radio node 20 to begin with a default table, which may not be fully particularized with respect to a given interference-canceling receiver 14 in a given device 12, and then refine that table over time.

With respect to the above processing, the channel quality synthesis circuit 26 in one or more embodiments is configured to perform the processing operations represented by Blocks 302, 304, 306, and 308, for example, while the link adaptation/scheduling circuit 24 is configured to perform the processing operations represented by Block 310. Further, the channel quality reporting control circuit 28 is configured to identify the neighbor cells 18 which are interferer cells 18 of interest, with respect to channel quality reporting by the device 12. That is, the channel quality reporting control circuit 28 may be configured to monitor which neighbor cells 18 are reported by the device 12 as interfering cells 18, to select the dominant one or most-dominant ones of those cells 18 as interferer cells 18 of interest, and to send indications of such to the device 12, to cause the device 12 to provide neighbor-cell channel quality reporting for the selected interferer cells 18.

Turning back to FIG. 2, the example device 12 comprises one or more transmit/receive antennas 50 and an associated signaling interface 52 that is configured to send signals to the network 10 and receive signals from the network 10. For example, the signaling interface 52 comprises a wireless communication transceiver having a radio receiver and a radio transmitter configured for operation in the cellular communication network 10.

The device 12 further comprises a processing circuit 54 that is operatively associated with the signaling interface 52. The processing circuit 54 is configured to send interference-cancelation capability information to the network 10, indicating one or more characteristics of interference-cancelation processing the device 12 is configured to perform. The processing circuit 54 is further configured to generate a channel quality report for a serving radio node 20 in the network 10 with respect to a current transmission interval. In this regard, the processing circuit 54 is configured to determine one or more neighbor-cell channel quality values with respect to a neighbor cell 18 that that was detected by the device 12 as making an interfering transmission in the current transmission interval.

Still further, the processing circuit 54 is configured to determine a set or range of serving-cell channel quality values versus different interference cancelation efficiencies assumed for the interfering transmission, or versus different transport formats assumed for interfering transmission, and transmit the channel quality report to the serving radio node 20 via the signaling interface 52. Here, it will be understood that the interference cancelation efficiency of the device 12 with respect to the interfering transmission depends on the transport format used by the neighbor cell for the interfering transmission.

With respect to the above processing configuration, the processing circuit 54 functionally or physically comprises the aforementioned interference-canceling receiver 14 and the channel quality reporting circuit 16. The processing circuit 54 further comprises or is associated with memory/storage 56, such as FLASH, EEPROM, or other solid-state or disk-based storage, and the device 12 may further include additional processing circuitry 62, such as user interface circuitry, application-level processing circuitry, etc., in accordance with the intended use and feature set of the device 12.

In one or more embodiments, the memory/storage 56 stores a computer program 58 and mapping information 60. The mapping information 60 may simply comprise an indication of the type of interference-canceling receiver 14 implemented by the device 12, which can be then used by the radio node 20 to determine the mapping between the interfering-signal cancelation efficiency of the interference-cancelation receiver 14 and the transport format of an interfering signal being canceled. Alternatively, the mapping information 60 may comprise a look-up table or other data structure that gives characteristic cancelation efficiencies for a range or set of defined transport formats—e.g., for a number of different transport formats that are known for use in the network 10.

The processing circuit 54 may comprise fixed circuitry, programmed circuitry, or some combination of both. In one or more embodiments, the processing circuit 54 is specially adapted to carry out the device-side processing contemplated herein, based on its execution of the program instructions comprising the computer program 58 stored in the memory/storage 56. In that regard, the memory/storage 56 will be understood as including some type of computer-readable medium that provides persistent data storage for the computer program 58.

Figure 4:
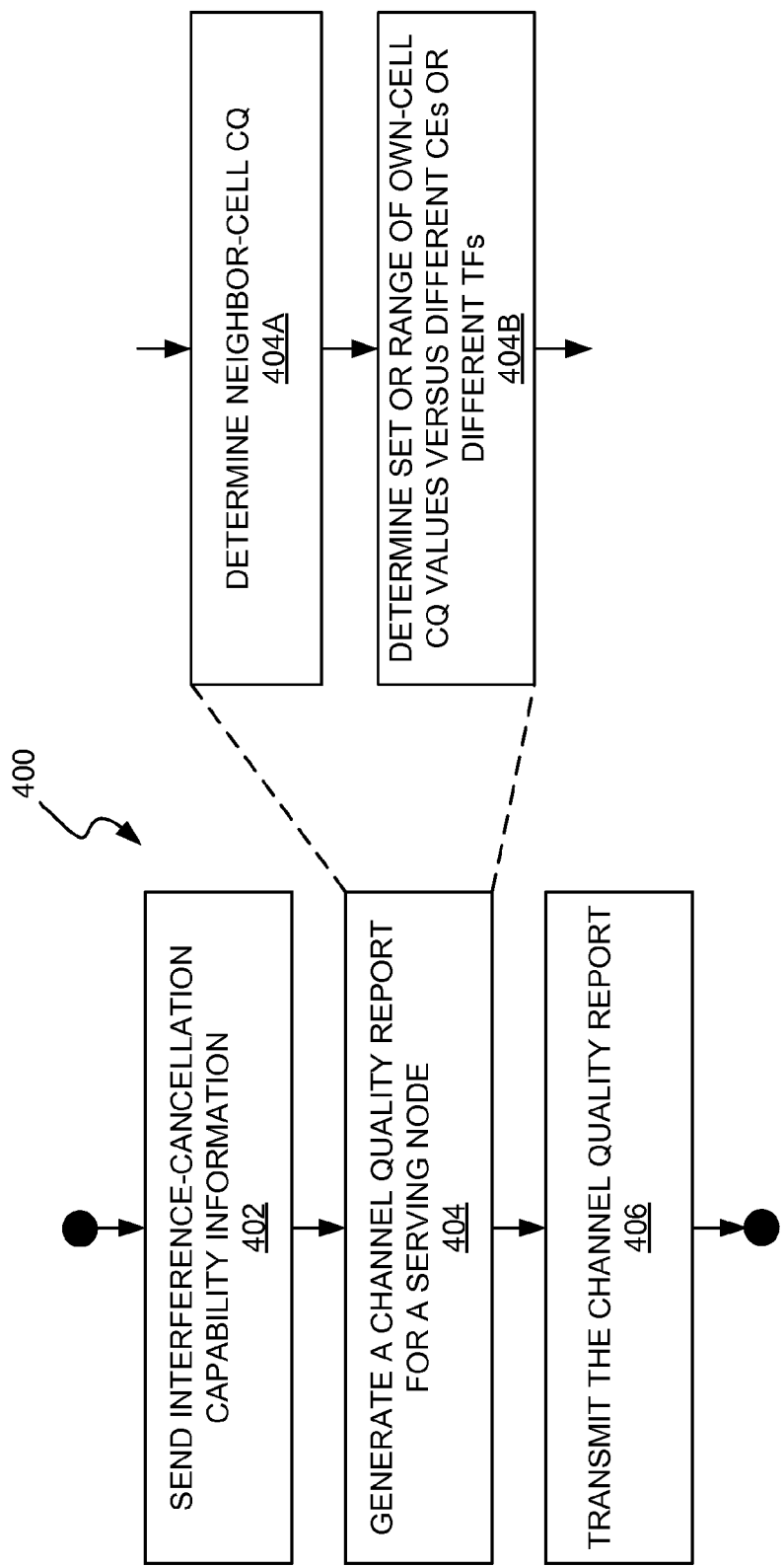
FIG. 4 is a logic flow diagram of one embodiment of a method of channel quality reporting for link adaptation, as performed by a wireless device having an interference-canceling receiver.

In an example case, the computer program 58 comprises program instructions that, when executed by the processing circuit 54, configure the processing circuit 54 to carry out the method 400 illustrated in FIG. 4. The method 400 provides for channel quality reporting by a wireless device 12 configured for operation in a cellular communication network 10, and includes sending (Block 402) interference-cancelation capability information to the network 10, indicating one or more characteristics of interference-cancelation processing the device 12 is configured to perform. The characteristics may be indicated by sending, e.g., a receiver type indication or by sending mapping information characterizing the interference cancelation efficiency of the interference-canceling receiver 14 of the device 12 for a range of interfering-signal transport formats and, optionally, different interfering-signal channel qualities.

The method 400 further includes generating (Block 404) a channel quality report for a serving radio node 20 in the network 10 with respect to a current transmission interval. It will be understood that this step may follow Step 402 some indeterminate time later, and that Step 402 may, for example, be done once with respect to any given serving cell 18, while Steps 404 and 406 are repeated every transmission interval, or on an otherwise frequent basis.

In any case, in some embodiments, Block 404 includes determining (Block 404A) one or more neighbor-cell channel quality values with respect to a neighbor cell 18 originating a neighbor-cell transmission that was detected by the device 12 as an interfering transmission in the current transmission interval, and determining (Block 404B) a set or range of serving-cell channel quality values versus different interference cancelation efficiencies assumed for the interfering transmission, or versus different transport formats assumed for interfering transmission. As noted, the interference cancelation efficiency of the device 12 with respect to the interfering transmission depends on the transport format used by the neighbor cell 18 for the interfering transmission.

The method 400 further includes transmitting (Block 406) the channel quality report to the serving radio node 20. The channel quality report is sent for the current transmission interval from the perspective of the device 12, but it is used by the radio node 20 at a later transmission interval that, from the perspective of the radio node 20 is then the current transmission interval. For example, in a first transmission interval, the device 12 sends a channel quality report to the radio node 20, based on measurements and estimations performed by the device 12 for the first transmission interval, and then in a later second transmission interval, the radio node 20 extrapolates, interpolates, or otherwise determines the own-cell channel quality towards the device 12, as expected in the second transmission interval, based on the values reported for the first transmission interval.

In some embodiments, the method 400 includes identifying the neighbor cell 18 or cells 18 for inclusion in the channel quality report based on: identifying one or more neighbor cells 18, including aforementioned neighbor cell 18, as interfering neighbor cells 18, sending an indication of the interfering neighbor cells 18 to the serving radio node 20, and receiving a return indication identifying the neighbor cell 18 as an interferer cell 18 of interest to include in channel quality reporting. In at least one such embodiment, the method 400 includes sending an updated indication to the network 10 from time to time, as to which neighboring cells 18 are seen as interfering cells 18 by the device 12. In turn, the radio node 20 may send updated indications to the device 12, as to which neighbor cells 18 are interferer cells 18 of interest.

With the above network-side and device-side processing in mind, it will be understood that a serving radio node 20 as contemplated herein obtains actual knowledge of the transport format that will be used for an interfering transmission during a current transmission interval, and uses the known transport format to more accurately estimate the cancelation efficiency that will be achieved by the interference-canceling receiver 14 of a device 12, with respect to the interfering transmission. Here, the cancelation efficiency of the interference-canceling receiver 14 is a function of interfering-signal transport format, and is known to the radio node according to a mapping between cancelation efficiency and transport format determined for the device 12.

In turn, the more accurate estimation of cancelation efficiency is used to obtain a more accurate estimate of the own-cell channel quality that will be experienced by the device 12 for an own-cell transmission towards the device during the current transmission interval. For example, an own-cell channel quality estimate made by the device 12 in a prior transmission interval is adapted, transformed or otherwise used with the more accurate estimate of cancelation efficiency to derive a more accurate estimate of the actual, post-cancelation signal quality that the device 12 will experience in the current transmission interval with respect to the own-cell transmission. Here, it is safely assumed that the channel conditions from the prior interval are generally still applicable to the current transmission interval. In some embodiments, channel quality averaging over two or more intervals may be used to filter such values.

In a particular example, the interference cancelation efficiency of the device 12 with respect to an interfering neighbor-cell transmission depends in a characteristic, known manner on the actual transport format used by the neighbor cell for the interfering transmission. As the device generally does not have actual knowledge of the transport format used for the interfering transmission, it parameterizes its own-cell channel quality directly or indirectly as a function of interfering-signal transport format, for a range or set of defined transport formats. That is, in a given transmission interval, the device 12 measures own-cell channel quality on a pre-cancelation basis and then derives what its post-cancelation own-cell channel quality would be for a range or set of assumed interfering-signal transport formats.

The device 12 sends this set or range of own-cell channel quality values to the radio node 20. Then, in a subsequent transmission interval, the radio node 20 obtains an indication of the actual transport format that will be used for a neighbor-cell transmission that is expected to interfere with an own-cell transmission to be made towards the device 12 in that subsequent transmission interval. It advantageously uses that known transport format and the previously reported set or range of own-cell channel quality values to identify or derive the own-cell channel quality expected for the device 12 in this subsequent transmission interval. This improved estimation also may incorporate consideration of the dependency of interference cancelation efficiency at the device 12 on neighbor-cell channel quality.

With the above in mind it will be appreciated that a first aspect of the teachings herein involved signaling from the device 12 to the network 10. It is contemplated that a device 12 signals one or more characteristics or parameters of its interference-canceling receiver 14. For example, the device 12 may signal its interference-cancelation capability class, such as pre-decoding configuration, post-decoding configuration, its capabilities for common and control channel interference cancelation, its interference-cancelation adaptivity or interference cancelation quality parameters, etc.

Such signaling is sent to the network 10 by the device 12 at connection time, e.g., using higher-layer signaling. The network 10 may have a nominal cancelation efficiency map for each class or type of interference-canceling receiver 14. Mapping information for the different types or classes receivers is stored, for example, as the mapping information 40 in the memory/storage 36 of given radio nodes 20.

Alternatively, the device 12 transmits its actual cancelation-efficiency mapping table comprising, e.g., a set of cancelation efficiencies corresponding to different interfering-signal transport formats. Yet another alternative is that the device 12 transmits its cancelation efficiency relative to a standardized CE mapping table, wherein the relative mapping can be limited to some few values or constitute a complete mapping table. In one embodiment, the transmitted mapping table may consist of cancelation efficiency values for a fixed or custom sampling of interfering-signal transport formats and interfering-signal SINR values. Cancelation efficiency values for transport format and SINR values not represented in the table are found by interpolating between the table entries.

Further, a radio node 20 can remap the cancelation efficiency values for the reported transport formats to cancelation efficiency values corresponding to actual transports used for the interfering transmissions of interest. Small mismatches between the assumed and actual cancelation efficiency have only a limited performance impact. Note, too, that some devices 12 may transmit full cancelation-efficiency mapping tables, while other devices 12 transmit only receiver type or class information, and rely on the network 10 to determine the corresponding cancelation-efficiency mapping table as pre-stored in the network 10.

Another aspect of the teachings herein relates to the signaling of significant interferers. At infrequent intervals, e.g., at intervals much longer than one TTI or whatever the basis transmission interval is defined as, or at the request of the network 10, a given device 12 signals to the network 10 a list of significant potential interfering cells 18. For example, the device 12 sends a list of cell IDs, CIDs, for the neighbor cells 18 having the strongest signals towards the device 12. The strongest cells 18 can be detected by the device 12 using CRS power measurements on the received neighbor-cell signals.

In turn, the serving radio node 20 of the device 12 is configured to send a list of interferer cells 18 of interest to the device 12, from time to time. The sending interval may be on a per transmission interval, or may be longer. The interferer cells 18 of interest are identified by the serving radio node 20 as, for example, the intersection between the set of neighbor cells 18 that the device 12 has identified as interfering cells 18 and the set of neighbor cells 18 that have been or will be scheduled for data transmissions in a future transmission interval or intervals.

In at least one particular scenario, the set of interferer cells 18 of interest may devolve into a single interferer cell 18 of interest. For example, consider the case where the device 12 is served by a pico cell 18-1 that overlays a portion of a macro cell 18-2. In such cases, downlink transmissions originating in the macro cell 18-2 often dominate the interference seen by the device 12 with respect to own-cell downlink transmissions from the pico cell 18-2 to the device 12. More generally, in scenarios where the device 12 is served by a low-power radio node 20 and operates in a range extension region, the associated macro cell transmissions represent the only significant interfering transmission. In such cases, the signaling between the device 12 and the low-power radio node 20 regarding the list of interfering cells 18 from the device 12 to the node 20, and the list of interferer cells 18 of interest from the node 20 to the device 12, may be skipped.

In another, related aspect of the teachings herein, the device 12 may be configured to expand its channel quality reporting, so that neighbor-cell channel quality is reported in addition to own-cell channel quality, at least for the interferer cells 18 of interest, as identified by the device 12 and/or by the network 10.

In one such embodiment, at intervals faster than fading changes, possibly at each transmission interval, the device 12 reports channel quality values for the serving cell 18 and for one or more interferer cells 18. Here, a channel quality value can be a Channel Quality Indicator or CQI value, or can be an SINR measurement, or can be another defined value representing Channel State Information or CSI with respect to the corresponding cell 18. The channel quality report sent by the device 12 in a given current transmission interval generally is valid for that transmission interval and may be assumed to remain valid for use by the serving radio node 20 in a future transmission interval, at least in terms of the basic channel quality estimates.

For example, in a given current transmission interval from the serving radio node's perspective, the pre-cancelation own-cell channel quality reported by the device 12 in a prior transmission interval provides a valid basis for estimating what the post-cancelation channel quality will be for the device 12 in the current transmission interval, according to the known transport format(s) to be used for the interfering neighbor-cell transmissions to be made in the current transmission interval.

The information included in a given channel quality report by the device 12 can be varied, as will be appreciated by those of ordinary skill in the art. However, in some embodiments herein, it includes one or more own-cell channel quality values representing estimated or measured channel quality with respect to own-cell transmissions from the serving radio node 20, and one or more neighbor-cell channel quality values representing estimated or measured channel quality with respect to one or more interfering neighbor-cell transmissions.

The reported information thus may assume many possible forms and includes one or more of the following parameters: own-cell channel quality, e.g., CSI, without interference cancelation, own-cell channel quality, e.g., CSI, with interference cancelation on all interfering cells 18 being addressed via interference-cancelation processing at the device 12, own-cell channel quality with interference cancelation according to current interfering transport format on one interfering cell 18 at a time, own-cell channel quality with modeled full removal of one interfering cell 18 at a time, channel quality values for individual interfering cells 18, and an own-cell channel quality table for different interfering cells 18 at different cancelation efficiencies with respect to each interfering cell 18, e.g., an N-dimensional table for N interferer cells 18 of interest.

In some simplified embodiments, which are particularly well suited for low mobility or semi-static scenarios, the channel quality reporting with respect to interfering cells 18 may be omitted. In turn, the radio node 20 may be configured to evaluate the signal strength or SIR measurement reports from the device 12 to assess the interfering link channel quality.

Regardless of the channel quality reporting implementation, a notable aspect of the teachings herein involves the estimation by the network 10, e.g., by the relevant serving node 20, of the own-cell channel quality that is expected at the device 12 for a current transmission interval in which an own-cell transmission will be made towards the device 12, and for which the actual transport format is known for a neighbor-cell transmission that is expected to be an interfering transmission with respect to the own-cell transmission. Of course, the estimation may account for multiple interfering transmissions in view of their known transport formats and the cancelation efficiencies correspondingly expected for them at the device 12, based on the determined mappings between interfering-signal transport format and interference cancelation efficiency at the device 12.

In an example operation, during each transmission interval, the link adaptation/scheduling circuit 24 at a given radio node 20 uses channel quality information previously derived or received from a served device 12, in combination with the scheduling information known with respect to interfering signals in the past and current transmission intervals, to accurately estimate the effective own-cell channel quality of the device 12 in the current transmission interval. This more accurate estimation can be understood as a "synthesizing" the effective own-cell channel quality of the device 12 for the current transmission interval, based on actual knowledge of interfering signal transport formats at issue in the current and past transmission intervals. The more accurate channel quality estimation is then used by the radio node 20 to determine the preferred transmission settings for the own-cell transmission to the device 12 in the current transmission interval, including selection of the most aggressive transport format that can be used in view of the more accurately estimated effective own-cell channel quality. Here, the most "aggressive" transport format is the one that transmits the most bits while still meeting any applicable decoding reliability targets, e.g., a decoding probability of ninety-percent.

In at least some embodiments contemplated for the link adaptation/scheduling circuit 24 of a serving radio node 20, the circuit 24 uses previously reported channel quality information from a served device 12, along with knowledge of the transport formats used for the relevant interfering signals in the past and the current transmission interval, to synthesize an accurate estimate of the effective own-cell channel quality at the served device 12. The effective own-cell channel quality is then used to select the preferred transmission settings for the own-cell transmission to the served device 12 in the current transmission interval, including the scheduling of an appropriate transport format. Transport format selection here can be more aggressive, because the interference cancelation performance to be achieved by the device 12 in the current transmission interval is more accurately known as a consequence of the radio node 20 having actual knowledge of the relevant interfering signal transport formats.

The radio node 20 may obtain channel quality for each interferer cell 18 of interest at the victim device 12 based on conventional, legacy methods. In another approach, channel quality for the own cell without considering interference cancelation is computed using legacy methods known for linear, non-IC receivers. Channel quality for the own cell assuming full interference cancelation can then be computed for a certain neighbor cell 18 by computing the signal or impairment covariance matrix for the linear receiver, subtracting a parametrically constructed covariance correction term for the interferer, and computing channel quality using the corrected covariance matrix. The difference between the channel quality values thus computed for each interferer gives an estimate of channel quality for that interferer.

In another option, channel quality for the own cell is computed without considering the effect of interference cancelation, using legacy methods known for linear, non-IC receivers. Channel quality for the own cell is then computed in consideration of interference cancelation as performed on a selected one of the interferer cells 18 of interest, based on evaluating the actual post-IC symbol SINR seen at the device 12. Because the radio node 20 knows the actual transport format that was used for that interferer cell transmission, and knows the characteristic cancelation efficiency of the device's interference-canceling receiver 14 for that transport format, it can compute the relevant neighbor-cell channel quality.

The radio node 20 next uses one or more items of information to obtain cancelation efficiency estimates for one or more the interferer cells 18 of interest with respect to the current transmission interval. For example, the radio node 18 bases the cancelation efficiency estimate on the determined mapping between cancelation efficiency and interfering-signal transport format. Additionally, the cancelation efficiency estimate may be more sophisticated, based on incorporating consideration of the estimated interferer channel quality, e.g., SINR. In such cases, the cancelation efficiency of the device 12 is characterized as a function of interfering-signal transport format and as a function of interfering-signal channel quality, so the determined mapping can be indexed or otherwise used to find an accurate estimate of cancelation efficiency in the current transmission interval with respect to a given interferer cell 18.

In at least one embodiment, a cancelation efficiency mapping table takes on the form of CE=F1(SINR, TF). Here, "CE" denotes cancelation efficiency, and "F1" connotes a function of interfering-signal transport format and interfering-signal channel quality, e.g., SINR. The F1 function or table thus is used to estimate the CE for each interferer cell 18 of interest at the victim device 12 during the current transmission interval. The mapping table may be obtained from the device 12 or constructed by the radio node 20, e.g., based on previous interference-cancelation capability signaling from the device 12.

The radio node 20 then uses one or more of the following combinations of information to estimate, i.e., "synthesize", an accurate own-cell channel quality estimate for the device 12 in the current transmission interval. That estimate is based on the estimated cancelation efficiencies of the device 12 with respect to the interferer cells 18, which efficiencies are more accurately known in view of the radio node 20 knowing the actual transport format(s) to be used by the interferer cell(s) 18 during the current transmission interval. The radio node 20 then uses the own-cell channel quality estimate to perform link adaptation towards the device 12 in the current transmission interval, e.g., to select the appropriate transport format to use for the own-cell transmission towards the device 12, and may also select precoding and rank settings for the own-cell transmission and, optionally, for one or more of the interferer-cell transmissions.

Consider a more detailed example. A served device 12 has reported in a prior transmission interval its own-cell channel quality. In particular, the device 12 reported a set or range of own-cell channel quality values corresponding to a set or range of interfering-signal transport formats. Such a set or range of own-cell post-IC channel quality values may be reported for each interferer cell 18 of interest. That is, the device 12 assumed or predicted the transport formats used by one or more interferer-cells 18 of interest in the prior transmission interval, and correspondingly calculated what its post-IC own-cell channel quality would be for each of those predictions or assumptions. Thus, the set or range of own-cell channel quality values reported may comprise a matrix or table of values, e.g., with each row/column representing the transport format assumption for a different one of the interferer cells 18 of interest, and with each entry representing the resulting own-cell post-IC channel quality value. Alternatively, indexing may be by assumed per-cell cancellation efficiency values, rather than assumed transport format values.

Then, for a current transmission interval where it is assumed that the same interferer cells 18 are of interest with respect to the device 12, the radio node 20 determines the expected cancelation efficiency of the device 12, where that determination is based on actual knowledge of the transport formats that will be used by the interferer cells 18 of interest. For example, the own-cell post-IC channel quality estimated for the device 12 for the current transmission interval is computed by combining the channel quality gains associated with the known transport formats for all of the interfere cells 18 of interest. Each of those gains may be determined from the reported table or matrix of channel quality values, based on finding the entries that best match the transport formats known for the interferer cells 18 for the current transmission interval and/or interpolating between the entries that bracket the known transport formats.

Such processing can be seen as taking the assumed IC gains as reported by the device 12 in the prior transmission interval and adapting them as needed in view of the radio node having actual knowledge of the transport formats that will be used by the interferer cells 18 in the current transmission interval. The own-cell channel quality is then computed for device 12 for the current transmission interval by combining the adapted channel quality gains, and the radio node 20 then advantageously schedules the maximum-size transport format that is supported by the thus-synthesized channel quality estimate.

Note that in cases where the device 12 is served by a pico cell 18-1 that is interfered with by a macro cell 18-1, it may be that pico-cell transmissions generally do not interfere with macro-cell transmissions. In such instances, the radio node 20, alone or in combination with another network node, may be configured to select the transport format for a macro cell transmission in the current interval first, then estimate the resultant own-cell post-IC channel quality for the device 12, and then use that own-cell channel quality estimate to select the best transport format for serving device 12 from the pico cell 18-1 in the current transmission interval.

In other embodiments, the scheduling process may include simultaneously scheduling several IC-capable devices 12 within a set of neighboring cells 18, transmissions to which are mutually interfering. In such cases, the link adaptation teachings herein may be applied iteratively, to arrive at a robust transport format selection for all such simultaneously scheduled devices 12. This approach can be understood as jointly processing or otherwise optimizing the transport format selection for such devices 12.

Figure 5:
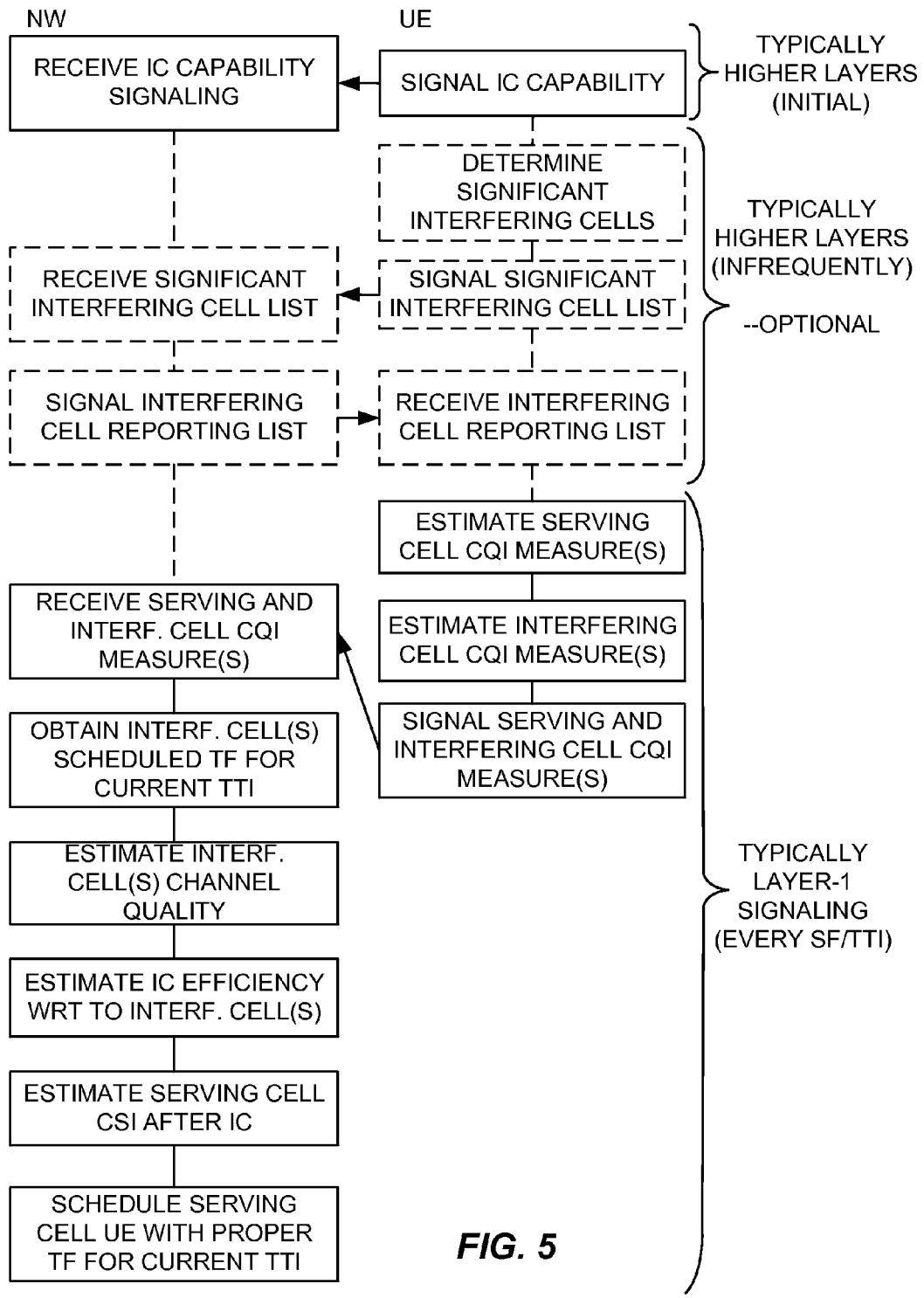
FIG. 5 is a signal flow diagram for one embodiment of link adaptation signaling and associated network-side and device-side processing.

In a more detailed example embodiment, consider the heterogeneous network environment illustrated in FIG. 1. FIG. 5 provides an example signal flow between a serving radio node 20 and a served device 12 in accordance with this example. The below-detailed operations reflect an expanded description of the illustrated signal flow.

At serving cell allocation time, the device 12, denoted as "UE" in FIG. 5, signals that it is IC-capable via higher-layer signaling and signals its cancelation efficiency, CE, performance. For example, the device 12 sends a table CE=F1 (SINR, TF). The table expresses the device's CE as a function of interfering-signal channel quality and interfering-signal transport format. In one embodiment, the transmitted mapping table may consist of CE values for a fixed or custom sampling of transport formats and SINR values. CE values for transport formats and SINR values not represented in the table are found by the serving radio node 20, denoted as "NW" in FIG. 5, using, e.g., interpolation and/or extrapolation. For example, the device 12 transmits CE values for six predetermined transport formats and eight SINR values, where the SINR range may be predetermined for each transport format assumed for reporting. This approach results in fewer than fifty values per table. The serving radio node 20 can remap the reported CE values to CE values corresponding to actual transport formats known for any given current transmission interval.

At infrequent intervals, e.g. once per several seconds, the device 12 determines the potentially interfering neighbor cell(s) 18, e.g. by measuring the received pilot/CRS power for neighbor cells 18. The device 12 signals a list of dominant interfering Cell IDs to the serving radio node 20 via higher-layer signaling.

In the heterogeneous network scenario, typically only the macro cell 18-2 will be reported as an interfering cell 18. At each TTI, the device 12 transmits a channel quality report, e.g., a CSI report, with respect to the interfering macro cell 18-2. The channel quality report is valid for the transmission interval in which it is reported, and for a subsequent interval in which it is used by the radio node 20 to perform link adaptation towards the device 12 in that subsequent transmission interval. From the perspective of the device 12, it reports channel quality for the current transmission interval. From the perspective of the radio node 20, it performs link adaptations in a current transmission interval, using channel quality information reported by the device 12 in a prior transmission interval.

For the channel quality report sent by the device 12 in each transmission interval, the device 12 also transmits a table of own-cell channel quality values as a function of macro-cell CE. For example, the device 12 sends CSI_sc=F2 (CE_ic1, CE_ic2, . . . ). Here, "F2" can be understood as providing a set or range of channel quality values, e.g., CSI values, as a function of different cancelation efficiencies assumed or predicted by the device 12 for interference cancelation with respect to the macro cell 18. That is, CE_ic1, CE_ic2, etc., represent different own-cell post-IC channel estimates for different cancelation efficiency assumptions with respect to an interferer cell 18 of interest. Assuming that the macro cell 18-2 is the only interferer cell 18 of interest, the device 12 computes the own-cell channel quality it would see after interference cancelation with respect to the macro cell 18-2, for each one in a set or range of assumed macro-cell signal transport formats.

When such processing is performed for only one interferer cell 18 of interest, the own-cell CSI table, the F2 table, is only one-dimensional. However, the approach extends directly to the case where multiple interferer cells 18 are considered, by reporting a set or range of own-cell channel quality values for a given set or range of assumed cancelation efficiencies for each interferer cell 18 of interest. For each interferer cell 18 of interest, the reporting may be limited to a manageable set or range of CE assumptions, e.g., CE=0, 0.25, 0.5, 0.75, and 1. A CE value of zero means no cancelation and a CE value of 1 means full cancelation.

For semi-static or slowly changing environments, the own-cell CSI-versus-interfering-signal transport format table may be valid over many transmission intervals. In some embodiments, therefore, the table is updated in its entirety at regular intervals. The update interval depends on the temporal variability of the channel, e.g., Doppler. In other embodiments, the table may be updated by the device 12 incrementally over several transmission intervals, at a relatively low signaling rate.

At any case, in the example scenario where the serving radio node 20 is a low-power node handling the pico cell 18-1, the radio node 20 uses the channel quality report received from the device 12 in an earlier transmission interval. In particular, the radio node 20 uses the table and the transport format that is known to be selected for use in the macro cell 18-2 in the current transmission interval, to obtain an accurate estimate of the own-cell channel quality that the device 12 will experience in the current transmission interval, after interference cancelation with respect to, "WRT" in FIG. 5, the macro cell 18.

To compute the own-cell channel quality estimate, the radio node 20 in one or more embodiments is configured to: obtain the macro cell scheduling decision for the current transmission interval; use the channel quality report previously sent by the device 12 to estimate the current channel quality of the interference link from the macro cell 18-2 to the device 12; estimate the CE that will be achieved by the device 12 in the current transmission interval with respect to the macro cell 18-2, based on previously signaled F1 table; estimate the own-cell post-IC channel quality for the device 12, for the current processing interval, using the F2 table; and schedule the device 12 for the current transmission interval using the estimated own-cell post-IC channel quality.

The approach of signaling the table CSI_sc=F2(CE_ic1, CE_ic2, . . . ) and basing the synthesis of the own-cell post-IC channel quality at the device 12 for the current transmission interval on the combination of the tables F1 and F2 provides the best performance with limited signaling capacity. For example, signaling is minimized by parameterizing the F2 table according to different CE levels, for different interfering signal transport format assumptions, where the parameterized range provides good resolution for estimating the own-cell post-IC channel quality at the device 12 for the current transmission interval, in view of actual knowledge of the transport format(s) that are known to be selected for the interferer cell transmissions of interest in the current transmission interval.

Figure 6:
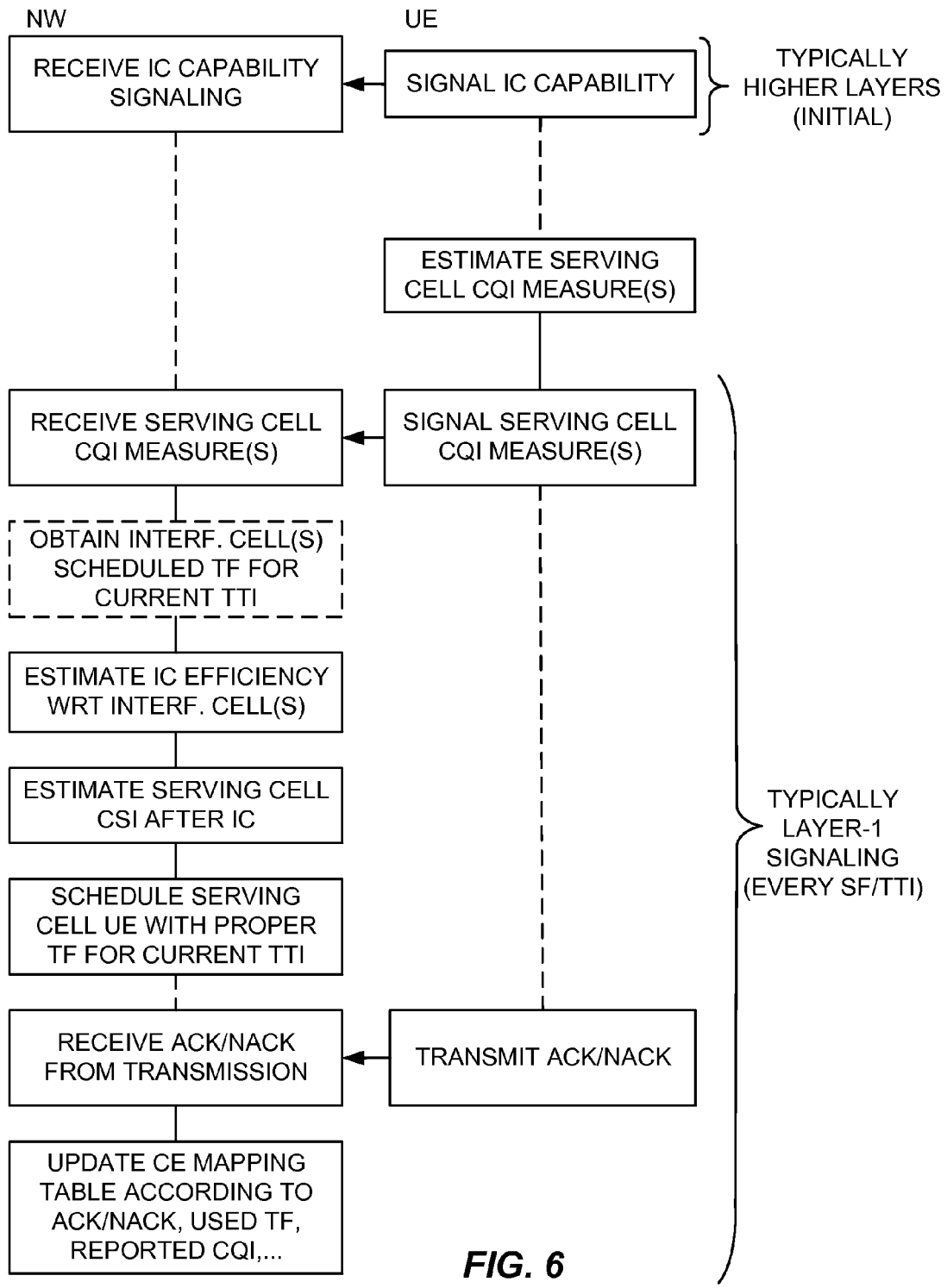
FIG. 6 is a signal flow diagram for another embodiment of link adaptation signaling and associated network-side and device-side processing.

FIG. 6 illustrates an example signal flow between a serving radio node 20, denoted as "NW" in FIG. 6, and a served device 12, denoted as "UE" in FIG. 6, in an alternative approach. According the depicted alternative, the device 12 initially indicates its interference-cancelation capability, but sends conventional, legacy channel quality reports during normal operation. The below-detailed operations represent an expanded explanation of the illustrated signal flow.

The device 12 signals its interference-cancelation capability information, e.g., at initial connection. The information may be sent directly to the radio node 20, or may be sent indirectly to the radio node 20 from another node in the network 10. The device 12 signals at each transmission interval a CSI table that is parameterized by interfering cell transport format. For example, the F2 table can be formed as CSI_sc=F2(TF_ic1, TF_ic2, . . . ). Here, TF_ic1, TF_ic2 etc., represent different own-cell channel quality values for different interfering-signal transport format assumptions. In this approach, the initial signaling of table F1 is not necessary. Preferably, the table F2 contains entries for a sparse set of transport formats and the radio node 20 is configured to interpolate the CSI values for transport formats not included in the F2 table.

Another example of the teachings herein may be formulated where the device 12 only uses legacy channel quality reporting. A typical scenario is where the device 12 has low intensity traffic and the network 10 wishes to minimize the uplink, UL, control signaling. Another scenario for this example is when the device 12 cannot, due to complexity, perform the previously described signaling.

Accordingly, when the device 12 connects to a serving radio node 20, it transmits its IC capability to the radio node 20. During active mode—i.e., during ongoing connected operation—the device 12 transmits at regular or irregular intervals, legacy channel quality reports with respect to the own-cell. These legacy channel quality reports are based on the kind of reporting that would be done by a linear, non-IC receiver.

In turn, in such embodiments, the radio node 20 uses the own-cell channel quality reported received from the device 12 in a previous transmission interval to estimate the own-cell post-IC channel quality expected for the device 12, for the current transmission interval. With that estimate, the radio node 20 schedules an optimal transport format for the current transmission interval. The synthesis is performed by: (1) estimating the interfering cell channel quality based on the reported own-cell channel quality, the known previous subframe interfering transport format and the determined CE mapping table for the device 12; (2) and estimating the own-cell post-IC channel quality that will be experienced at the device 12 in the current subframe, based on the known interfering-signal transport format and the determined CE mapping table.

As an example of the processing contemplated in the foregoing Item (1), consider the case where the radio node 20 has a mapping table that maps the CE of the device 12 as a function of interfering-signal channel quality and interfering signal TF. The reported own-cell channel quality in this case is a post-IC value, thus reflecting the CE achieved by the device 12 with respect to the interfering signal. The radio node 20 therefore infers the CE from the reported own-cell channel quality. It then uses the inferred CE in combination with the TF known to be used for the interfering transmission from the neighbor cell 18, to index into the mapping table and find or derive the corresponding neighbor-cell channel quality. Thus, the mapping table is used in a reverse sense, to estimate the neighbor-cell channel qualities.

The mapping table can be a static table which is based on a typical IC receiver performance for the device's reported IC capability class. Alternatively, the mapping table is updated and adapted over an extended time, using the observed performance of many devices 12 for each IC receiver capability class. The updating mechanism is based in one or more embodiments on reported ACK/NACK from the devices 12 whose performance is observed, and knowledge of the interfering-signal transport formats at issue with respect to those ACK/NACKs. Reported interferer cell channel quality and transmission rank also may be considered. Note, too, that some types of communication networks support conventional channel quality reporting with respect multiple base stations. When the teachings herein are applied in such networks, the multi-cell channel quality reporting can be exploited using known transport format information for interfering signals transmitted in the cells for which channel quality was reported. That is, the separate interfering-cell channel quality reports allow a radio node 20 that is configured according to the teachings herein to account more precisely for different interfering transport formats from different interfering cells 18 at the current transmission interval.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of channel quality reporting by a wireless device configured for operation in a cellular communication network, said method comprising:
   sending interference-cancelation capability information to the network, indicating one or more characteristics of interference-cancelation processing the device is configured to perform;
   generating a channel quality report for a serving radio node in the network with respect to a current transmission interval, based on:
   determining a neighbor-cell channel quality with respect to a neighbor cell originating a neighbor-cell transmission using a selected transport format, wherein the neighbor-cell transmission was detected by the device as an interfering transmission in the current transmission interval;
   determining, with respect to the serving radio node, a set or range of own-cell channel quality values versus different interference cancelation efficiencies assumed for the interfering transmission, or versus different transport formats assumed for the interfering transmission, wherein the interference cancelation efficiency of the device with respect to the interfering transmission depends on which transport format was used by the neighbor cell for the interfering transmission; and transmitting the channel quality report to the serving radio node.

2. The method of claim 1, further comprising identifying the neighbor cell for inclusion in the channel quality report based on:
sending an indication to the serving radio node that the neighbor cell is an interfering neighbor cell; and
receiving a return indication identifying the neighbor cell as being an interferer cell of interest to include in channel quality reporting.

3. The method of claim 2, further comprising sending updated indications to the network from time to time, as to which neighboring cells are seen as interfering cells by the device, and receiving corresponding updated return indications as to which neighbor cell or cells are interferer cells of interest to include in the channel quality reporting.

4. The method of claim 1, wherein sending the interference-cancelation capability information comprises sending an indication as to whether the device is configured to perform pre-decoding interference cancelation or post-decoding interference cancelation.

5. The method of claim 1, wherein sending the interference-cancelation capability information includes sending mapping information that maps a set or range of interfering-signal transport formats to a corresponding set or range of interference cancelation efficiencies of the device.

6. A wireless device configured for operation in a cellular communication network, said device comprising:
a signaling interface configured to send signals to the network and receive signals from the network;
a processing circuit operatively associated with the signaling interface and configured to:
send interference-cancelation capability information to the network, indicating one or more characteristics of interference-cancelation processing the device is configured to perform;
generate a channel quality report for a serving radio node in the network with respect to a current transmission interval, based on being configured to:
determine a neighbor-cell channel quality with respect to a neighbor cell originating a neighbor-cell transmission using a selected transport format, wherein the neighbor-cell transmission was detected by the device as an interfering transmission in the current transmission interval;
determine a set or range of serving-cell channel quality values versus different interference cancelation efficiencies assumed for the interfering transmission, or versus different transport formats assumed for the interfering transmission, wherein the interference cancelation efficiency of the device with respect to the interfering transmission depends on which transport format was used by the neighbor cell for the interfering transmission; and
transmit the channel quality report to the serving radio node via the signaling interface.

* * * * *